United States Patent [19]

Kacsor

[11] 3,800,821
[45] Apr. 2, 1974

[54] FUEL LOCK
[76] Inventor: Sandor Kacsor, 325 Bogert Ave. Apt. 449, Willowdale, Ontario, Canada
[22] Filed: Apr. 12, 1972
[21] Appl. No.: 243,288

[52] U.S. Cl............ 137/384.4, 137/552.5, 137/613, 137/637.3, 251/297
[51] Int. Cl............................................ F16k 35/08
[58] Field of Search.......... 137/384.4, 552.5, 637.3, 137/613; 251/297

[56] References Cited
UNITED STATES PATENTS
1,444,083   2/1923   Porteous et al.................. 137/552.5

Primary Examiner—Henry T. Klinksiek

[57] ABSTRACT

A fuel lock for preventing unauthorized operation of the vehicles, particularly adapted for vehicles equipped with internal combustion engine.

1 Claim, 8 Drawing Figures

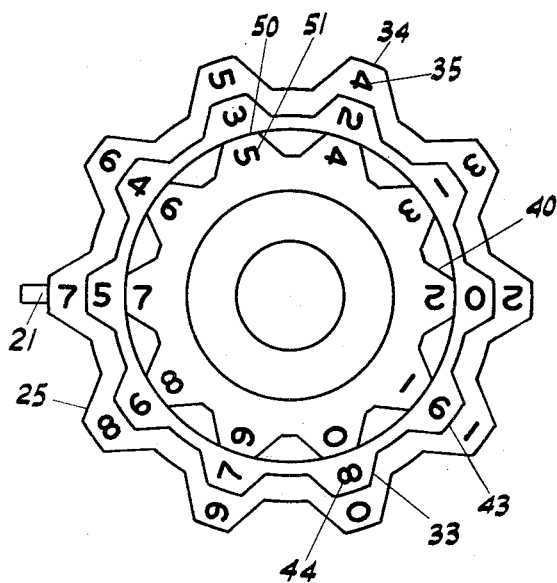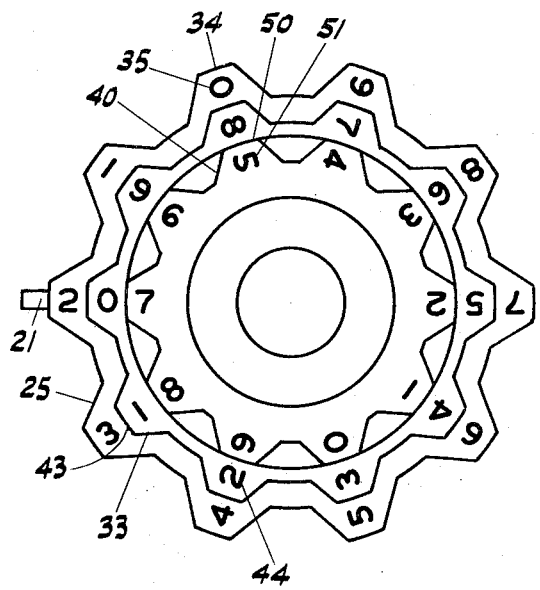
FIG. 6    FIG. 8
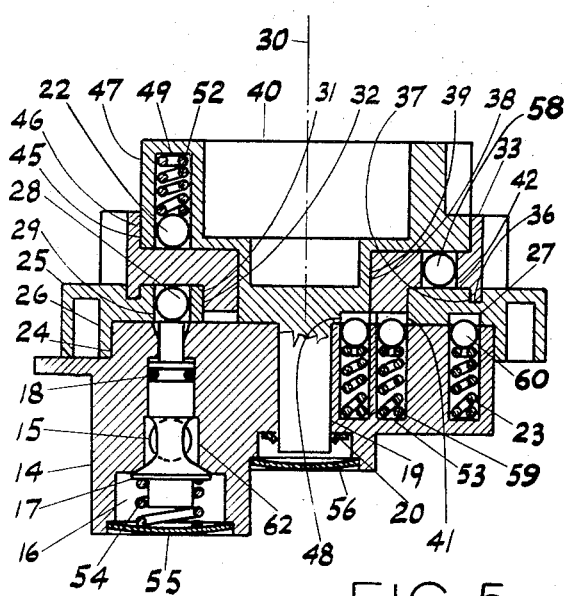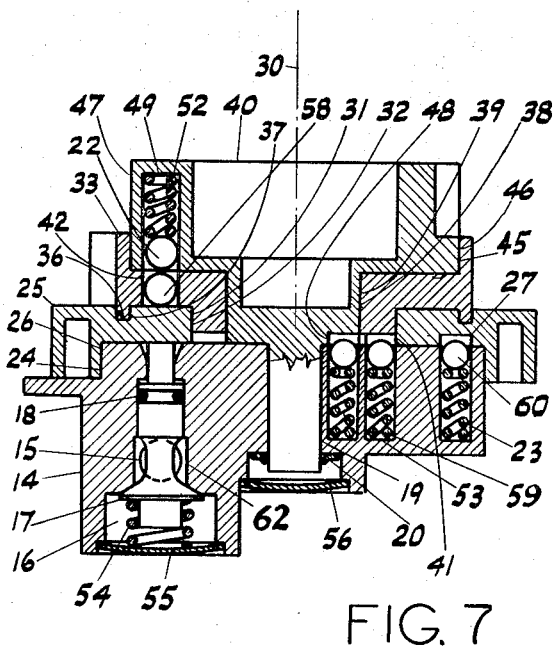
FIG. 5    FIG. 7

3,800,821

FUEL LOCK

In recent years the unauthorised posession of the number of vehicles are on increase. By conservative estimates these incidents cost hundreds of million dollars a year in USA alone, not including other countries in Western Europe, and in other continents. Among the number of reasons is that of the relatively easy access to the vehicles.

Some theft preventive accessories are already available, but most of them work on the alarm principle e.g., the slightest movement of the car sounds an electrically operated alarm, or the horn of the vehicle. The disadvantage of this alarm system is, that the slightest movement of the vehicles could happen accidentally, e.g., somebody lean against it, or a sudden wind blow, etc., which can sound the alarm. Since it is electrically operated it must have an "on" and "off" switch hidden somewhere, which can be switched on after the driver is out of the vehicle and must be switched off before entering the vehicle. Because of these conditions there are not many places left to conceal the switch and hence it is possible to neutralize the system by different methods.

The invention is directed to a fuel lock for vehicles equipped with internal combustion engine, wherein the fuel lock is mounted in the fuel line anywhere between the carburetor and the fuel tank or between the fuel injection and the fuel tank. With this arrangement defined upon thereby, provide an advantage arising from a simple mechanical device which denies the fuel supply from an unauthorised use of the vehicle unless the proper code has been set. The fuel lock includes a plurality of coded dials defined thereon which selectively engage a fuel supply shut off means. This type of fuel lock does not require electricity as do the more conventional devices, and its function does not depend on secret installation like those of the more conventional types.

Another object of the invention is to provide a fuel lock for vehicles equipped with internal combustion engine whereby the fuel lock may be mounted in the fuel line between the carburetor and the fuel tank.

A further object of the invention is to provide a fuel lock for vehicles equipped with internal combustion engine whereby the fuel lock may be mounted in the fuel line between the fuel injection and the fuel tank.

An additional object of the invention is to provide a fuel lock for vehicles equipped with internal combustion engine whereby the fuel lock may be an integrated part of a carburetor.

Yet another object of the invention is to provide a fuel lock for vehicles equipped with internal combustion engine whereby the fuel lock may be an integrated part of the fuel injection.

A further object of the invention is to provide a fuel lock for vehicles equipped with internal combustion engine whereby the fuel lock may be an integrated part of a fuel pump.

An additional object of the invention is to provide a fuel lock for vehicles equipped with an internal combustion engine whereby the fuel lock may be an integrated part of a fuel tank.

These and other objects of the invention arising from the details and relationship of the components of an embodiment thereof will be apparent from the following description and accompanying drawings wherein:

FIG. 5 is a similar view as FIG. 2 illustrating another typical shut-off condition produced with the adjacent dial.

FIG. 6 is a plan view of the dials indicating a shut-off condition by improper code setting.

FIG. 7 is a similar view as FIG. 2 illustrating another typical shut-off condition produced by yet another dial.

FIG. 8 is a plan view of the dials indicating a shut-off condition by improper code setting.

Figure 1:
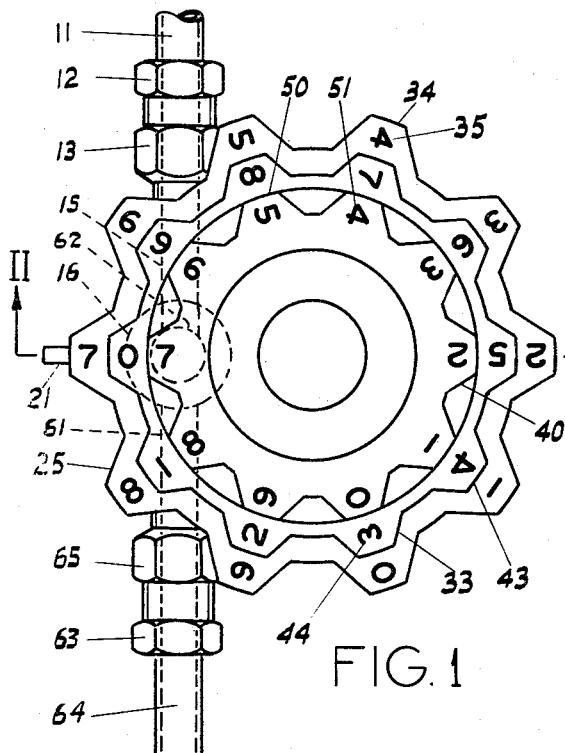
FIG. 1 is a plan view illustrating a fuel lock as assembled in the fuel line of an internal combustion engine.
Figure 4:
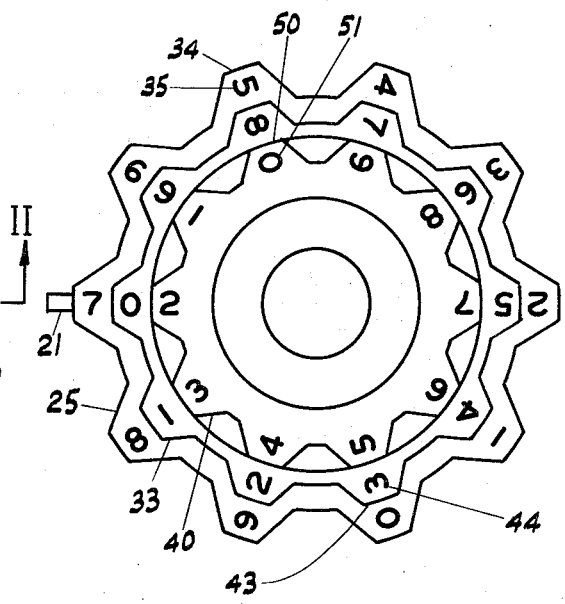
FIG. 4 is a plan view of the dials indicating a shut-off condition by improper code setting.

The environment in which the fuel lock is employed is shown in FIG. 1, wherein a carburetor, or fuel injection, or fuel pump at 10 is a commonly used type for different internal combustion engines, and a fuel lock is connected into the fuel line 11 to the receiving portion 15 of the housing 14 by standard automotive fittings 12 and 13, communicating with a valve receiving bottom chamber 16. The valve 17 adapted to receive a seal 18 having a fuel leakage prevention means. The housing 14 having a dials receiving hole 19, a code positioning indicator 21, rotation limiting ball 60, spring 23 and an axially extending hub projection 24 to receive dial 25, provided with a recess 26 adapted to be rotatably positioned. The said dial includes a plurality of dial retension concave seats 27 and the ball receiving holes 29. In addition the dial 25 is provided with a bore 31 to receive an axially extending hub projection 32 of dial 33, which also includes a dial receiving groove 36 to receive the next dial 33.

A dial 33 is provided with a recess 37, an axially extending hub projection adapted to be rotatably received upon the dial 25, and is also provided with a bore 38 adapted to be rotabably received upon an axially extending hub projection of dial 40. The said dial includes a plurality of dial retention concave seats 41 and the ball receiving holes 42 and the gripping portion 43, code markings 44 a recess to receive the next dial 40.

A dial 40 is provided with an axially extending hub projection 46 adapted to be rotatably received upon the dial 33, and is also provided with an axially extending hub projection 39 adapted to be rotatably received in a recess 37 of dial 33. The said dial includes a plurality of dial retention concave seats 48 and the ball receiving holes 49, the gripping portion 50 and the code marking 51.

A compression spring 52 a ball 22 being accommodated within a receiving hole 49 of dial 40, another ball 58 being accommodated within a ball receiving hole 42 of dial 33 and an additional ball 28 being received in a receiving hole 29 of dial 25.

A valve 17 adapted to receive a compression spring 54 and is supported by a plug 55 which completes the bottom valve chamber 16.

An additional plug 56 in housing 14 forms a dirt-free chamber in which the fastener 20 fits over the axially extending shaft 19 of dial 40 and locks the dials 25, 33, 40 to the housing 14.

Figure 2:
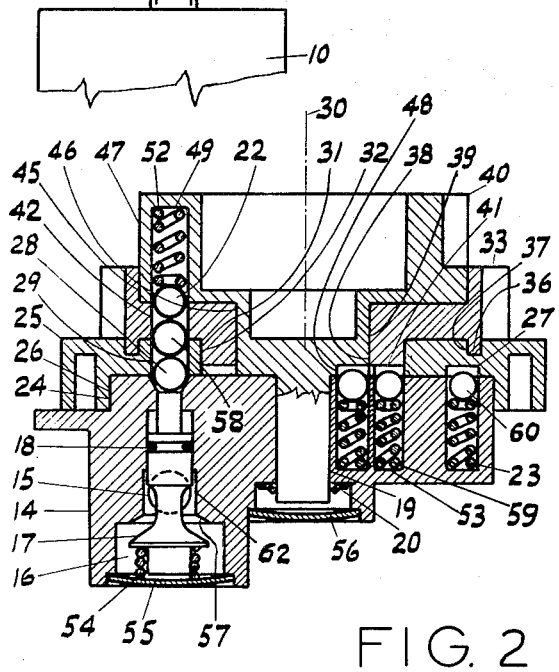
FIG. 2 is a sectional view taken on line II—II of FIG. 1 as the dials set to the only operative position required for the operation of an internal combustion engine.
Figure 3:
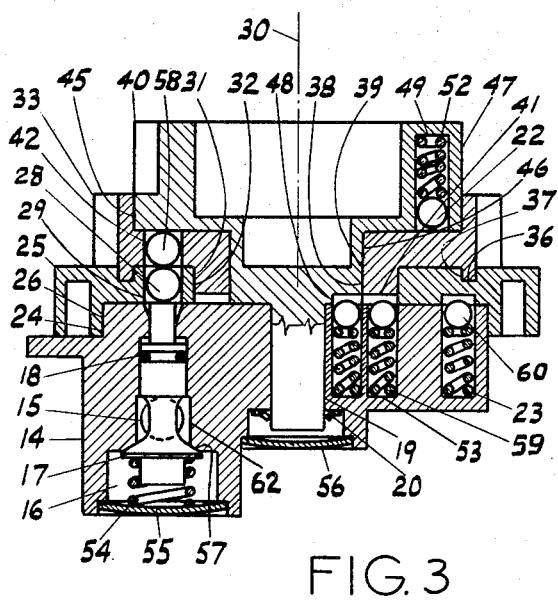
FIG. 3 is a similar view illustrating a typical shut-off condition produced with one of the dial.

The only operative position required for the fuel supply of an internal combustion engine by setting the proper code in FIG. 1 and due to the force transmitted from spring 52, shown in FIG. 2, via ball 22, ball 58, ball 28 will cause the valve 17 to leave the valve seat 57 and maintains an unrestricted fuel communication from the fuel line 11 via fittings 12 and 13, receiving portion 15, the top valve chamber 62, down into bottom valve chamber 16, to fitting receiving portion 61, to fittings 65 and 63 into fuel line 64.

The fuel lock of the invention can be readily employed with a wide variety of vehicle construction as it is only necessary to make modifications in the configuration of the fuel lock housing 14 to accommodate many vehicles.

It is appreciated that various modifications to the invention may be apparent to those skilled in the art without departing from the spirit and scope thereof, and it is intended that the invention be defined only by the scope of the following claims.

I claim:

1. A fuel lock for vehicles equipped with internal combustion engine particularly adapted for mounting in the fuel supply line of an engine comprising in combination, a housing having fitting receiving portions communicating with a valve receiving chamber equipped with a valve means adapted to receive a seal, having a fuel leakage prevention means and the said valve pressed against a valve seat by a compression spring, supported by a plug which closes the valve chamber, the said housing provided with a dial receiving bore, a dial mounting hub projection, a plurality of dial retention springs, balls accommodated in their nests, and with a code positioning indicator, a dial adjacent said housing having the plurality of dial detent concave seats, ball receiving holes equipped with a ball, the said dial having a dial receiving bore and a mounting recess, a gripping portion and the code markings, the next dial having the plurality of dial detent concave seats, ball receiving holes equipped with a ball, the said dial having a dial receiving bore, the mounting recess, a gripping portion and the code markings, a top dial provided with a hub projection, extending through the previously mentioned dials into the housing with a fastener fitting over the said hub projection and locking the dials to the housing, the top dial having a plurality of dial detent concave seats, a ball receiving hole equipped with a ball, the top said dial also having a gripping portion and the code markings, and, a plug in the bottom of the said housing adjacent to the said fastener forming a dirt-free chamber for addition protection.

* * * * *